(12) United States Patent
Onizuka et al.

(10) Patent No.: US 11,370,192 B2
(45) Date of Patent: Jun. 28, 2022

(54) CARBON-FIBER-REINFORCED MOLDED ARTICLE

(71) Applicant: NITTA CORPORATION, Osaka (JP)

(72) Inventors: Maki Onizuka, Osaka (JP); Katsuyuki Nakai, Osaka (JP); Takuji Komukai, Osaka (JP); Hiromi Teruhira, Osaka (JP)

(73) Assignee: NITTA CORPORATION, Osaka (JP)

(*) Notice: Subject to any disclaimer, the term of this patent is extended or adjusted under 35 U.S.C. 154(b) by 0 days.

(21) Appl. No.: 16/485,473

(22) PCT Filed: Feb. 9, 2018

(86) PCT No.: PCT/JP2018/004706
§ 371 (c)(1),
(2) Date: Aug. 13, 2019

(87) PCT Pub. No.: WO2018/151053
PCT Pub. Date: Aug. 23, 2018

(65) Prior Publication Data
US 2019/0358930 A1    Nov. 28, 2019

(30) Foreign Application Priority Data

Feb. 14, 2017   (JP) .............................. JP2017-024610
Jul. 3, 2017    (JP) .............................. JP2017-130651

(51) Int. Cl.
*B32B 9/00*      (2006.01)
*B32B 5/12*      (2006.01)
(Continued)

(52) U.S. Cl.
CPC ................ *B32B 5/12* (2013.01); *B32B 5/26* (2013.01); *C08J 5/06* (2013.01); *C08J 5/24* (2013.01);
(Continued)

(58) Field of Classification Search
CPC .......... B32B 5/12; Y10T 428/30; B82Y 30/00
(Continued)

(56) References Cited

U.S. PATENT DOCUMENTS 5,000,807 A * 3/1991 Stuart ................... B65H 51/01
                                                 156/166
7,867,468 B1 * 1/2011 Haddon ................ B82Y 30/00
                                                 423/447.1
(Continued)

FOREIGN PATENT DOCUMENTS

EP    2990380 A1   3/2016
EP    3211131 A1   8/2017
(Continued)

OTHER PUBLICATIONS

International Search Report issued in corresponding International Application No. PCT/JP2018/004706 dated May 15, 2018 (5 pages).
(Continued)

*Primary Examiner* — Daniel H Miller

(74) *Attorney, Agent, or Firm* — Osha Bergman Watanabe & Burton LLP

(57) ABSTRACT

A carbon fiber-reinforced molded article includes an arranged composite material and a cured resin product. The composite material includes a carbon fiber bundle and carbon nanotubes. The carbon fiber bundle is in which a plurality of continuous carbon fibers are arranged. The carbon nanotubes adhere to respective surfaces of the carbon fibers. A modulus of elasticity obtained by conducting a three-point bending test with a cushioning material is (Continued)

smaller than a modulus of elasticity obtained by conducting the three-point bending test without the cushioning material.

5 Claims, 17 Drawing Sheets

(51) Int. Cl.
  *B32B 5/26* (2006.01)
  *C08J 5/06* (2006.01)
  *C08J 5/24* (2006.01)
  *B82Y 30/00* (2011.01)
(52) U.S. Cl.
  CPC ... *B32B 2260/046* (2013.01); *B32B 2262/106* (2013.01); *B32B 2307/51* (2013.01); *B82Y 30/00* (2013.01); *C08J 2363/00* (2013.01); *Y10T 428/30* (2015.01)
(58) Field of Classification Search
  USPC .......................................................... 428/408
  See application file for complete search history.

(56) References Cited

U.S. PATENT DOCUMENTS

| | | | |
|---|---|---|---|
| 2011/0123735 A1* | 5/2011 | Shah | B32B 3/00 428/34.1 |
| 2011/0143087 A1* | 6/2011 | Alberding | B32B 5/16 428/114 |
| 2013/0202873 A1* | 8/2013 | Mizuki | C08L 63/00 428/299.1 |

FOREIGN PATENT DOCUMENTS

| | | | |
|---|---|---|---|
| EP | 3279255 A1 | 2/2018 | |
| EP | 3279394 A1 | 2/2018 | |
| JP | 2003-239171 A | 8/2003 | |
| JP | 2007-070593 A | 3/2007 | |
| JP | 2009-535530 A | 10/2009 | |
| JP | 2013-076198 * | 4/2013 | ............ C01B 31/02 |
| JP | 2013-076198 A | 4/2013 | |
| JP | WO2014/175319 A1 | 2/2017 | |
| TW | 201702292 A | 1/2017 | |
| WO | 2016/063809 A1 | 4/2016 | |
| WO | 2016/159121 A1 | 10/2016 | |
| WO | 2016/159122 A1 | 10/2016 | |
| WO | 2016/159125 A1 | 10/2016 | |

OTHER PUBLICATIONS

Written Opinion of the International Searching Authority issued in corresponding International Application No. PCT/JP2018/004706 dated May 15, 2018 (5 pages).
Extended European Search Report issued in corresponding European Application No. 18755012.4, dated Nov. 12, 2020 (9 pages).
Jinhai Guo et al., "Effect of electrophoretically deposited carbon nanotubes on the interface of carbon fiber reinforced epoxy composite"; J Mater Sci 47:2831-2836; 2012 (11 pages).
Office Action issued in corresponding Taiwanese Patent Application No. 107104987, dated Apr. 26, 2021 (8 pages).

* cited by examiner

FIG. 19
| | NUMBER OF IMPACTS APPLIED | |
|---|---|---|
| | ONCE | THREE TIMES |
| EXAMPLE 3 | 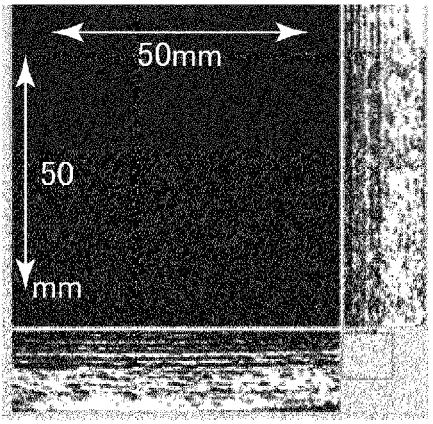 | 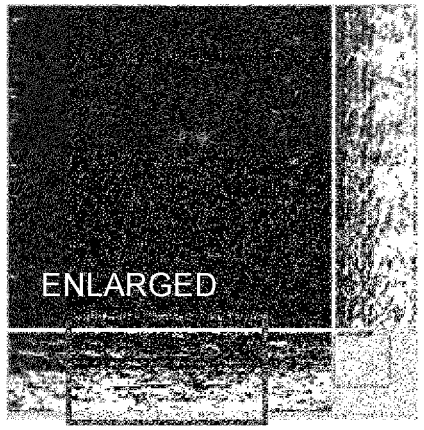 |
| COMPARATIVE EXAMPLE 3 | 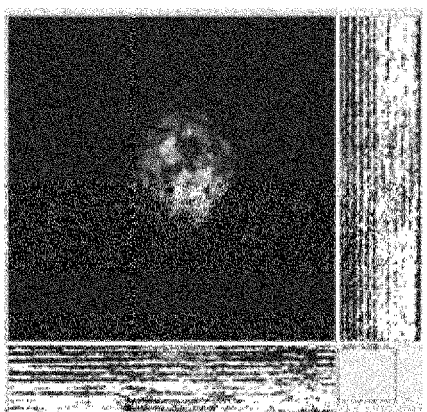 | 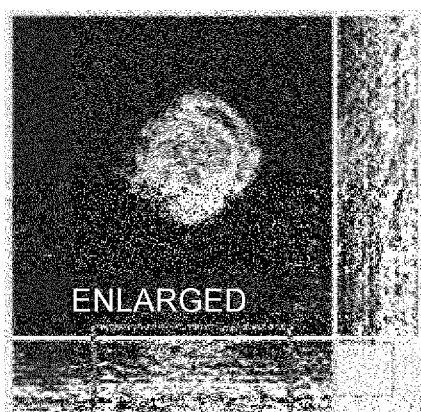 |

CARBON-FIBER-REINFORCED MOLDED ARTICLE

TECHNICAL FIELD

The present invention relates to a carbon fiber-reinforced molded article.

BACKGROUND ART

A composite material that includes fibers formed of a carbon material and structures formed on the surfaces of the fibers has been proposed (for example, Patent Literature 1). In Patent Literature 1, the structure includes a plurality of carbon nanotubes, the plurality of carbon nanotubes form a network structure in which they are directly connected to each other, and adhere directly to the surfaces of the fibers. According to the description, molded articles that include such a composite material can exhibit original functions that fibers can exhibit and at the same time can exert functions such as electrical conductivity, thermal conductivity, and mechanical strength which are derived from CNTs.

CITATION LIST

Patent Literature

Patent Literature 1: International Publication No. WO 2014/175319

SUMMARY OF INVENTION

Technical Problem

With regard to a molded article in which carbon fibers are used as a composite material (which will hereinafter be referred to as a "carbon fiber-reinforced molded article"), applications have been expanding in various fields such as aircraft, automobiles, general industries, and sporting goods. Requirements on properties such as strength for carbon fiber-reinforced molded articles have become ever more stringent.

For carbon fiber-reinforced molded articles, in addition to strength, faster damping of vibrations enabling absorption of impacts, or so-called damping property, is also required. A carbon fiber-reinforced molded article that has high intensity and is excellent in its damping properties has not yet been obtained.

In view of this, an object of the present invention is to provide a carbon fiber-reinforced molded article that has high intensity and is excellent in damping properties.

Solution to Problem

A carbon fiber-reinforced molded article in accordance with the present invention is a carbon fiber-reinforced molded article that includes an arranged composite material and a cured resin product, wherein the composite material includes a carbon fiber bundle in which a plurality of continuous carbon fibers are arranged and carbon nanotubes adhering to respective surfaces of the carbon fibers, and a modulus of elasticity obtained by conducting a three-point bending test with a cushioning material is smaller than a modulus of elasticity obtained by conducting the three-point bending test without the cushioning material.

Advantageous Effects of Invention

Since the carbon fiber-reinforced molded article of the present invention includes the composite material and the cured resin product and the modulus of elasticity according to the three-point bending test with the cushioning material is smaller than the modulus of elasticity according to the three-point bending test without the cushioning material, it can be said that the damping properties are excellent.

Furthermore, in the composite material contained in the carbon fiber-reinforced molded article of the present invention, the CNTs adhere to the respective surfaces of the carbon fibers in the carbon fiber bundles. By virtue of this, the carbon fiber-reinforced molded article of the present invention can exhibit higher strength.

BRIEF DESCRIPTION OF DRAWINGS

FIG. 3 is a schematic diagram that explains a three-point bending test method, where

FIG. 18 is graphs showing results of the Charpy impact test, where

FIG. 19 is a diagram that shows a result of a weight-drop test.

FIG. 20 is an enlarged view of portions indicated by a box in FIG. 19, where

DESCRIPTION OF EMBODIMENTS

Hereinafter, an embodiment of the present invention will be described in detail with reference to the drawings.

1. OVERALL CONFIGURATION

Figure 1:
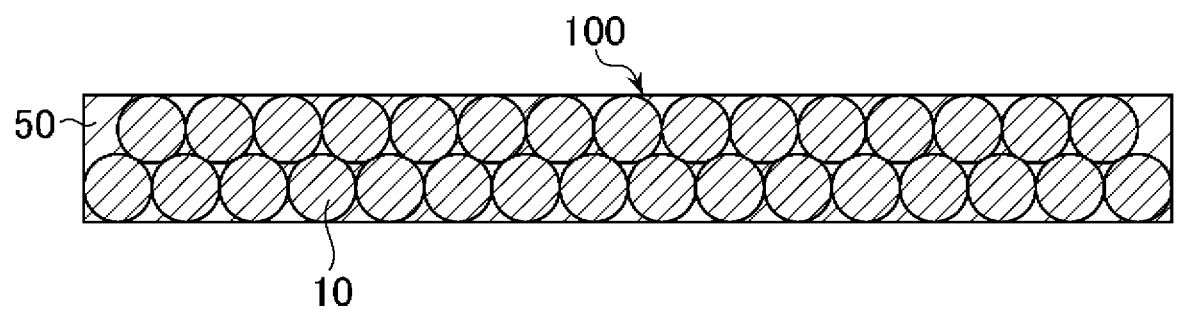
FIG. 1 is a cross-sectional view that illustrates a configuration of a carbon fiber-reinforced molded article in accordance with this embodiment.

As illustrated in FIG. 1, a carbon fiber-reinforced molded article 100 of this embodiment includes a composite material 10 and a cured resin product 50. A plurality of the composite materials 10 extend and are arranged in a direction orthogonal to the paper surface. With regard to the carbon fiber-reinforced molded article 100 of this embodiment, when three-point bending tests are conducted under two predetermined conditions as a test piece with a predetermined plate-like shape, two moduli of elasticity obtained are in a predetermined relationship.

Figure 2:
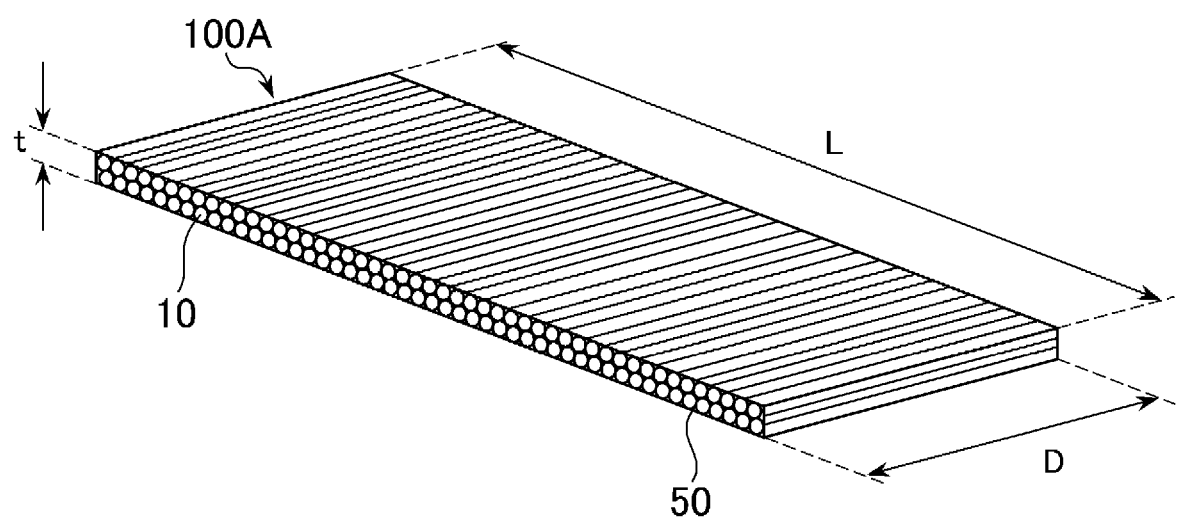
FIG. 2 is a perspective view that explains a test piece to be subjected to a three-point bending test.

In the three-point bending test, a test piece 100A in a plate-like shape with a width D, a length L, and a thickness t as illustrated in FIG. 2 can be used. The test piece 100A has the width D of 15 mm, has the length L of 100 mm, and has the thickness t of 1.8 mm. The plurality of composite materials 10 are arranged such that the longitudinal direction thereof corresponds to the width D of the test piece 100A.

Figure 3A:
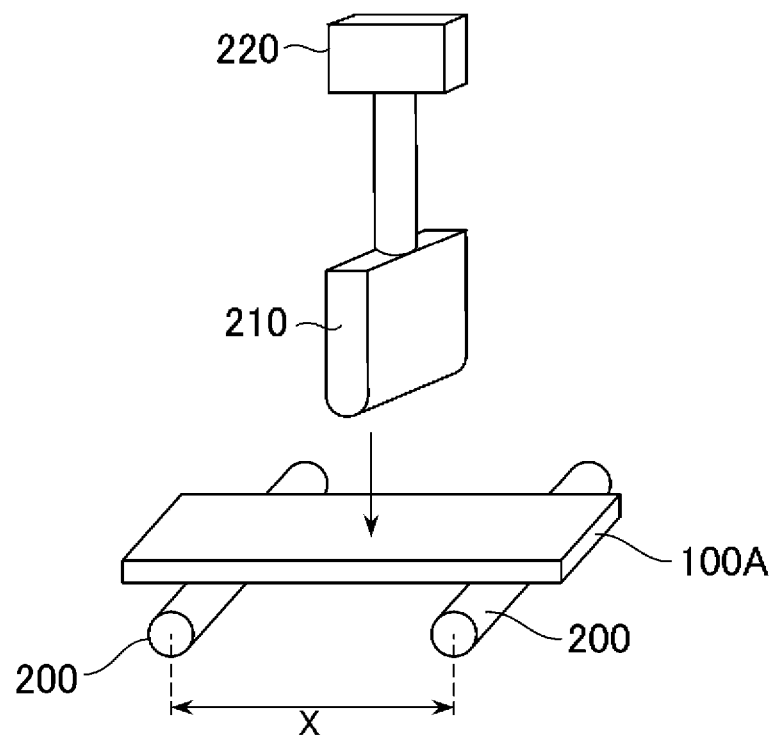
FIG. 3A illustrates a state of the three-point bending test without a cushioning material and FIG. 3B illustrates a state of a three-point bending test with a cushioning material.

In the test, first, as illustrated in FIG. 3A, the test piece 100A is supported by two supporting points 200 arranged with a predetermined distance x in the longitudinal direction of the test piece 100A. The distance x between the supporting points 200 is 80 mm. While a load is measured by a load cell 220, an indenter 210 is made to directly collide with the test piece 100A at a loading speed of 1 m/s. The indenter 210 is a metallic plate having a thickness of approximately 10 mm, whose longitudinal direction corresponds to the direction of the width D of the test piece 100A. The indenter 210 can be brought into contact with the test piece 100A at or near a tip with a round shape (with a radius of curvature of 5 mm) and traverse the test piece 100A. Using the load when the test piece 100A has broken, a modulus of elasticity EM0 in a case of no cushioning material is determined.

Figure 3B:
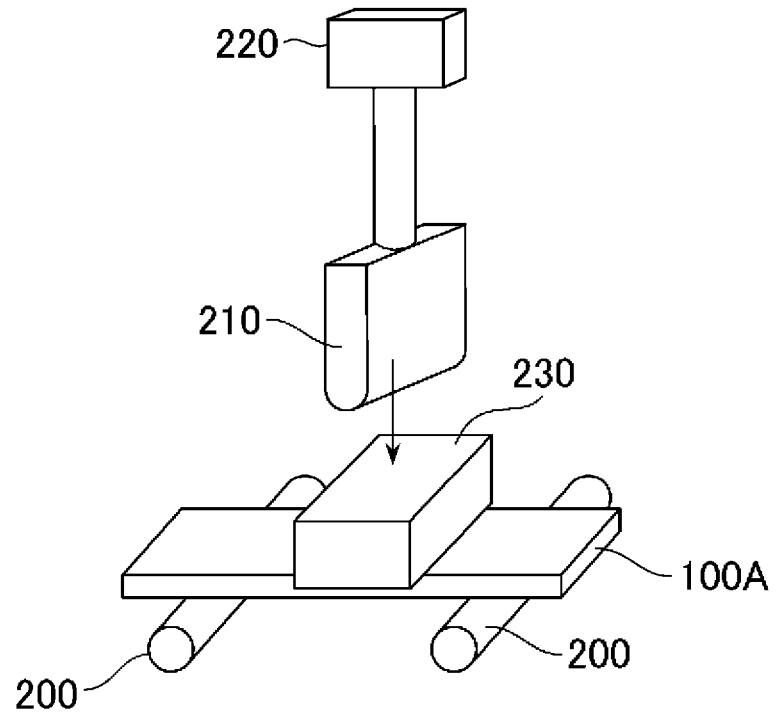

Next, as illustrated in FIG. 3B, the three-point bending test is conducted under the same conditions except that a cushioning material 230 is arranged between another test piece 100A having the same configuration and the indenter 210. As the cushioning material 230, a sponge rubber having a length of 30 mm, a width of 20 mm, and a thickness of 5 mm is used. The sponge rubber can be made of natural rubber. It is preferable that the cushioning material 230 has an Asker C hardness of approximately 20 to 80. In the same manner as described above, using the load when the test piece 100A has been broken, a modulus of elasticity EM1 of a case where a cushioning material is present is determined.

The modulus of elasticity EM1 according to the three-point bending test with the cushioning material 230 is smaller than the modulus of elasticity EM0 according to the three-point bending test without the cushioning material 230. In this embodiment, the modulus of elasticity EM1 of a case where the cushioning material 230 is present is equal to or less than 0.615 times the modulus of elasticity EM0 of a case where the cushioning material 230 is not present. It is preferable that the modulus of elasticity EM0 of a case where the cushioning material 230 is not present falls within the range of 8 to 12 GPa.

The cured resin product 50 in the carbon fiber-reinforced molded article 100 is a cured product of epoxy resin. The volume content of the cured resin product 50 is preferably 10 to 40%, and more preferably 15 to 33%. It is preferable that the cured resin product 50 has a modulus of elasticity of approximately 2 to 5 GPa.

Figure 4:
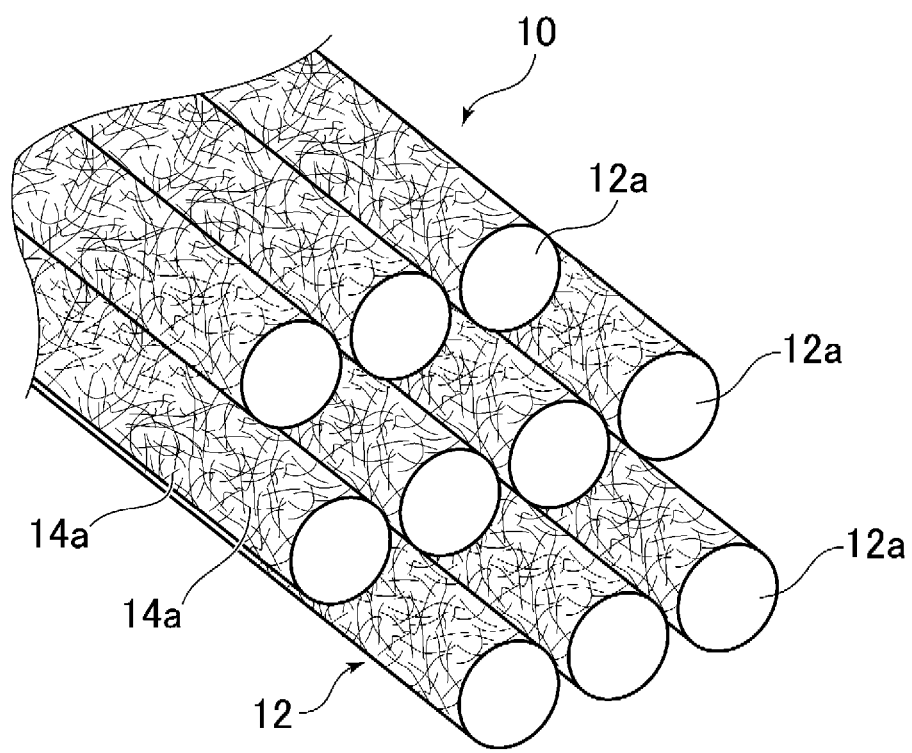
FIG. 4 is a schematic diagram that explains a feature of a composite material contained in the carbon fiber-reinforced molded article.

The composite material 10 contained in the carbon fiber-reinforced molded article 100 will be explained in detail with reference to FIG. 4. The composite material 10 includes carbon fiber bundle 12 in which a plurality of continuous carbon fibers 12a are arranged in one direction. The carbon fibers 12a each has a diameter of approximately 5 to 20 µm and are obtained by baking of organic fibers derived from fossil fuels, or organic fibers derived from wood or plant fibers.

Although, in the drawings, only ten carbon fibers 12a are illustrated for the sake of explanation, the carbon fiber bundle 12 in this embodiment can contain one thousand to one hundred thousand carbon fibers 12a. The carbon fibers 12a constituting the carbon fiber bundle 12 maintain linearity substantially without being entangled with each other. The composite material 10 of this embodiment containing these carbon fibers 12a has a shape of a strip in which 3 to 30 carbon fibers 12a are piled in the thickness direction.

Carbon Nanotubes (CNTs) 14a adhere to the surface of the respective carbon fibers 12a. The CNTs 14a are uniformly dispersed and entangled across substantially the entire surface of the carbon fibers 12a, being in direct contact with or directly connected to one another to form a network structure. It is preferable that no inclusions such as dispersing agents such as surfactant and adhesive exist between the CNTs 14a. Also, the CNTs 14a directly adhere to the surfaces of the carbon fibers 12a. The connection in this context includes physical connection (simple contact). Also, the adhesion in this context refers to binding by van der Waals force. Further, "direct contact or direct connection" includes a state in which the plurality of CNTs are integrally connected with each other, in addition to a state in which the plurality of CNTs simply come in contact with each other.

It is preferable that the length of the CNT 14a is 0.1 to 50 µm. If the CNTs 14a have a length of 0.1 µm or more, the CNTs 14a are entangled with each other and brought into direct connection. Also, if the CNTs 14a have a length of 50 µm or less, they are readily dispersed uniformly. Meanwhile, if the CNTs 14a have a length of less than 0.1 µm, the CNTs 14a are not readily entangled with each other. Also, if the CNT 14a has a length of more than 50 µm, they easily aggregate.

It is preferable that the CNTs 14a have an average diameter of approximately 30 nm or less. If the CNTs 14a have a diameter of 30 nm or less, they are rich in flexibility and are capable of creating a network structure on the surfaces of the respective carbon fibers 12a. Meanwhile, if the CNTs 14a have a diameter of more than 30 nm, they lose flexibility and will not be able to readily create a network structure on the surfaces of the respective carbon fibers 12a. It should be noted that the diameter of the CNT 14a is an average diameter measured using a transmission electron microscope (TEM) photograph. It is more preferable that the CNTs 14a have an average diameter of approximately 20 nm or less.

It is preferable that the plurality of CNTs 14a uniformly adhere to the respective surfaces of the carbon fibers 12a in the carbon fiber bundle 12. The state of adhesion of the CNTs 14a on the surfaces of the carbon fibers 12a can be evaluated by observing it with a scanning electron microscope (SEM) and visually checking the obtained image.

Further, at least part of the surfaces of the carbon fibers 12a to which the plurality of CNTs 14a adhere is covered by a resin called a sizing agent. As the sizing agent, urethane emulsions and epoxy emulsions are generally used. In the case of the composite material 10 in the carbon fiber-reinforced molded article 100, it may be in some cases difficult to confirm the presence of the sizing agent on the surfaces of the carbon fibers 12a.

As has been described in the foregoing, the carbon fibers 12a contained in the carbon fiber bundle 12 maintain linearity substantially without being entangled with each other. Entanglement of the carbon fibers 12a in the carbon fiber bundle 12 can be evaluated by the linearity of the carbon fibers 12a relative to each other.

Figure 5:
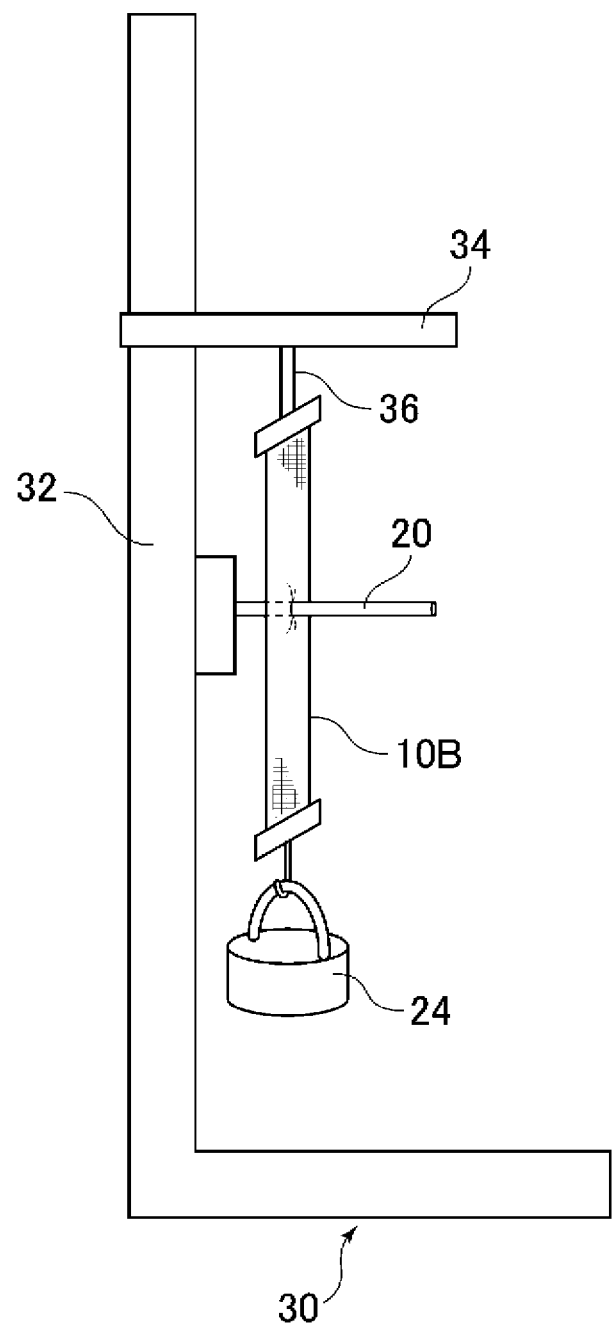
FIG. 5 is a schematic diagram that explains a method of evaluating entanglement of carbon fibers.

The method of evaluating linearity of the carbon fibers 12a relative to each other will be explained with reference to FIG. 5. In the evaluation, it is possible to use a support stand 30 having a standing portion 32 on which a transverse bar portion 34 movable upward and downward is provided. The composite material 10 is cut to a predetermined length (for example, approximately 150 to 300 mm) and a measurement sample 10B is prepared.

The measurement sample 10B is attached to the transverse bar portion 34 at an end thereof via a coupling member 36 so that the longitudinal direction coincides with the up-and-down direction. A weight 24 with an appropriate weight is connected to the other end of the measurement sample 10B such that the measurement sample 10B is taut. The weight of the weight 24 is selected such that the original length of the measurement sample 10B is maintained. By using the weight 24 with the appropriate weight, the measurement sample 10B is stably suspended from the transverse bar portion 34 of the support stand 30.

A inspection needle 20 (with a diameter of 0.55 mm) is provided at the standing portion 32 of the support stand 30 so as to extend in the horizontal direction. By inserting the testing needle 20 substantially perpendicularly in the surface of the measurement sample 10B and moving the transverse bar portion 34 upward, the measurement sample 10B and the inspection needle 20 are relatively moved. The moving speed is set to 300 mm/min and the moving distance is set to 40 mm.

A not-shown load cell is connected to the inspection needle 20. When the measurement sample 10B and the inspection needle 20 are relatively moved, the load acting therebetween is measured by the load cell. As the measured load is smaller, the carbon fibers 12a (see FIG. 4) in the carbon fiber bundle 12 will be more excellent in their linearity. In other words, the carbon fibers 12a contained in the carbon fiber bundle 12 will be unlikely to cause entanglement with each other.

When the composite material 10 used in this embodiment is moved relative to the inspection needle 20 under a predetermined condition, the maximum value of the load acting between the composite material 10 and the inspection needle 20 is less than 0.5 N, so that the plurality of continuous carbon fibers 12a are arranged substantially without being entangled with each other and with maintained linearity. The carbon fibers 12a arranged while maintaining the linearity can contribute to improvement in the strength of the composite material 10.

It is preferable that an average value of the loads acting between the composite material 10 and the inspection needle 20 is less than 0.4 N. An average of loads at 810 points are measured while the composite material 10 and the inspection needle 20 are relatively moved to each other by 40 mm and the average value of the applied loads is computed as an average of the loads at the 810 points.

2. PRODUCTION METHOD

Next, a method of Production the carbon fiber-reinforced molded article 100 in accordance with this embodiment will be explained. The carbon fiber-reinforced molded article 100 can be produced by creating a prepreg that contains the composite material 10 and curing the prepreg.

<Production of Composite Material>

The composite material 10 can be produced by immersing a carbon fiber bundle 12 containing a plurality of carbon fibers 12a in a CNT dispersion in which the CNTs 14a are isolated and dispersed (which may also be hereinafter referred to simply as a dispersion), making the carbon fiber bundle 12 travel, and causing the CNTs 14a to adhere to the respective surfaces of the carbon fibers 12a. Hereinafter, the respective steps will be explained in order.

(Preparation of Dispersion)

In the preparation of the dispersion, it is possible to use CNTs 14a produced in the following manner. The CNTs 14a can be created, for example, by forming a catalyst film composed of aluminum and iron on a silicon substrate using a thermal CVD method as described in Japanese Patent Application Laid-Open No. 2007-126311, micronizing the catalyst metal for CNT growth, and bringing the catalyst metal into contact with hydrocarbon gas in a heating atmosphere.

CNTs created by other methods such as arc discharge method and laser evaporation method may be used as long as the CNTs contain as few impurities as possible. Impurities can be removed by annealing the produced CNTs at high temperature in inert gas. The CNTs thus created has a high aspect ratio and linearity as they have a diameter of 30 nm or less and a length of several hundred micrometers to several millimeters. The CNTs may have either a single layer or multiple layers but preferably have multiple layers.

A dispersion in which the CNTs 14a are isolated and dispersed is prepared using the CNTs 14a that have been prepared as described above. The term isolated-dispersed means a state in which CNTs 14a are dispersed in a dispersion medium so that the CNTs 14a are each physically separated and not entangled with one another, and also in which the percentage of aggregates in which two or more CNTs 14a are aggregated in a bundle form is 10% or less.

Dispersion aims to make the dispersion of CNTs 14a uniform by using a homogenizer, shear force, an ultrasonic dispersion machine, etc. As the dispersion medium, it is possible to use water; alcohols such as ethanol, methanol, and isopropyl alcohol; and organic solvents such as toluene, acetone, tetrahydrofuran (THF), methyl ethyl ketone (MEK), hexane, normal hexane, ethyl ether, xylene, methyl acetate, ethyl acetate, etc.

For the preparation of the dispersion, additives such as dispersing agent and surfactant are not necessarily required, but the above additives may be used only in such a range as not to hinder the functions of the carbon fibers 12a and the CNTs 14a.

(Adhesion of CNTs)

The carbon fiber bundle 12 is immersed in the dispersion that has been prepared in the above-described manner and made to travel under a predetermined condition, mechanical energy is applied to the dispersion in this state, and thereby the CNTs 14a are made to adhere to the surfaces of the carbon fibers 12a.

The step of making the CNTs 14a adhere to the carbon fibers 12a will be explained with reference to FIG. 6. A plurality of guide rollers 42 for making the carbon fiber bundle 12 travel in the direction of the arrow A are arranged in a CNT adhesion tank 40 in which the dispersion 46 is stored. The guide roller 42 is, as illustrated in the side view of FIG. 7, a flat roller having a diameter D0 of 50 mm and a length L0 of 100 mm.

The carbon fiber bundle 12 is provided in such a manner that 3 to 30 carbon fibers 12a are piled in the thickness direction. The length L0 of the guide roller 42 is sufficiently large relative to the width w of the carbon fiber bundle 12. It is preferable that the carbon fiber bundle 12 is wound around the guide roller 42 with a smaller winding angle (90° or less). It is preferable that the guide rollers 42 are arranged such that they make the carbon fiber bundle 12 linearly travel.

The carbon fiber bundle 12 is firmly supported by the guide roller 42 and allowed to travel in the dispersion 46 without contraction. The carbon fibers 12a contained in the carbon fiber bundle 12 are subjected to tensile force while being supported by the guide roller 42 and thereby entanglement is reduced and linearity is improved.

Figure 6:
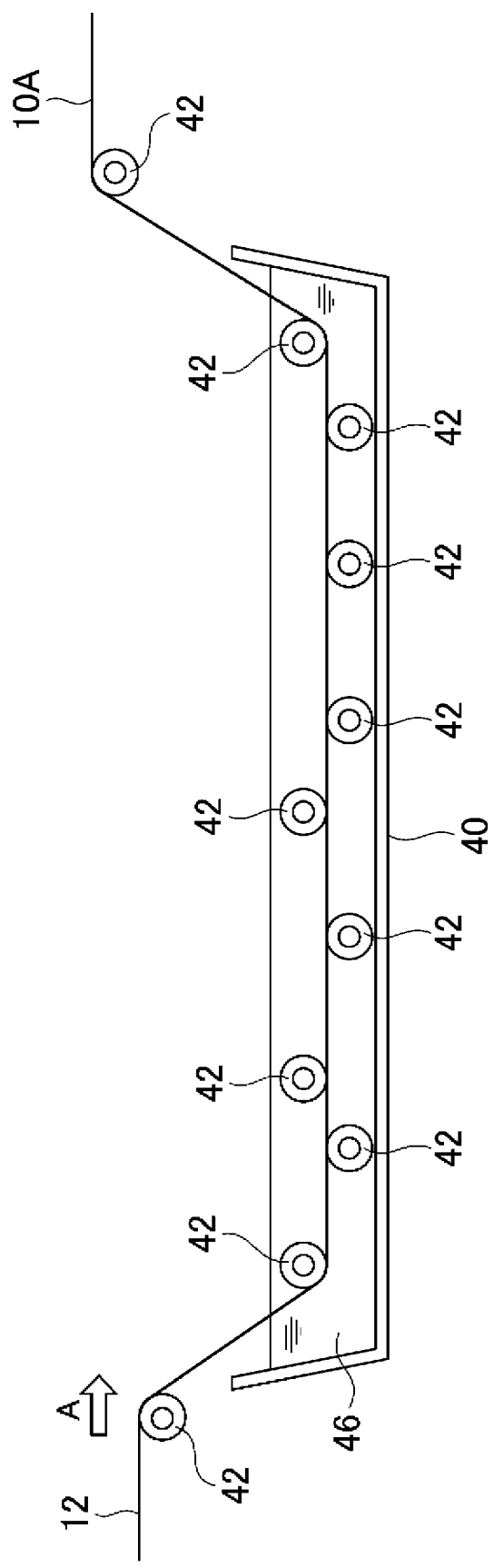
FIG. 6 is a schematic diagram that explains a CNT adhesion step.

As illustrated in FIG. 6, by virtue of the plurality of the guide rollers 42, the carbon fiber bundle 12 travels in the CNT adhesion tank 40 at a predetermined depth and at the traveling speed without being subjected to excessive load. During the travel, the carbon fiber bundle 12 is not bent, so that the risk of the entanglement of the carbon fibers 12a contained in the carbon fiber bundle 12 with each other is reduced. It is preferable that the traveling speed of the carbon fiber bundle 12 is set to approximately 1 to 20 m/min. When the traveling speed is slower, the linearity of the carbon fibers 12a in the carbon fiber bundle 12 can be made higher.

Mechanical energy such as vibration, ultrasonic waves, and rocking is applied to the dispersion 46. As a result of this, a reversible reaction state in which a dispersion state of the CNTs 14a and an aggregation state of the CNTs 14a are continuously generated in the dispersion 46, is created.

When the carbon fiber bundle 12 containing the plurality of continuous carbon fibers 12a are immersed in the dispersion placed in the reversible reaction state, then the reversible reaction state of the dispersion state and the aggregation state of the CNT 14a also occurs on the surfaces of the carbon fibers 12a. The CNTs 14a adhere to the surfaces of the carbon fibers 12a when the CNTs 14a exit the dispersion state and enter the aggregation state.

During aggregation, van der Waals forces act on the CNTs 14a and the CNTs 14a adhere to the surfaces of the carbon fibers 12a by the van der Waals forces. In this manner, a carbon fiber bundle 12 is obtained with the CNTs 14a adhering to the respective surfaces of the carbon fibers 12a in the carbon fiber bundle 12.

After that, sizing treatment and drying are performed and the composite material 10 is produced. The sizing treatment can be performed by a general method using a general sizing agent. The drying can be achieved with the carbon fiber bundles after the sizing treatment placed, for example, on a hot plate.

<Prodiction of Prepreg>

The composite material 10 can be made into a prepreg by immersing of the epoxy resin as a matrix resin. The cured product of the epoxy resin has a modulus of elasticity of approximately 2 to 5 GPa.

<Prodiction of Carbon Fiber-Reinforced Molded Article>

The prepreg is cut to a predetermined length and lamination is performed with the length directions aligned. The laminated body is subjected to pressure and in this state the matrix resin is heated and cured so as to be the cured resin product 50. As the method of applying heat and pressure, for example, press molding, autoclave molding, vacuum pressure molding, sheet winding, and internal pressure molding may be mentioned.

In a case where epoxy resin is used as the matrix resin, the cured resin product 50 is obtained by heating for 0.5 to 5 hours at 80 to 180° C. In this manner, the carbon fiber-reinforced molded article 100 of this embodiment that includes the composite material 10 and the cured resin product 50 is produced.

3. OPERATIONS AND EFFECTS

Figure 8:
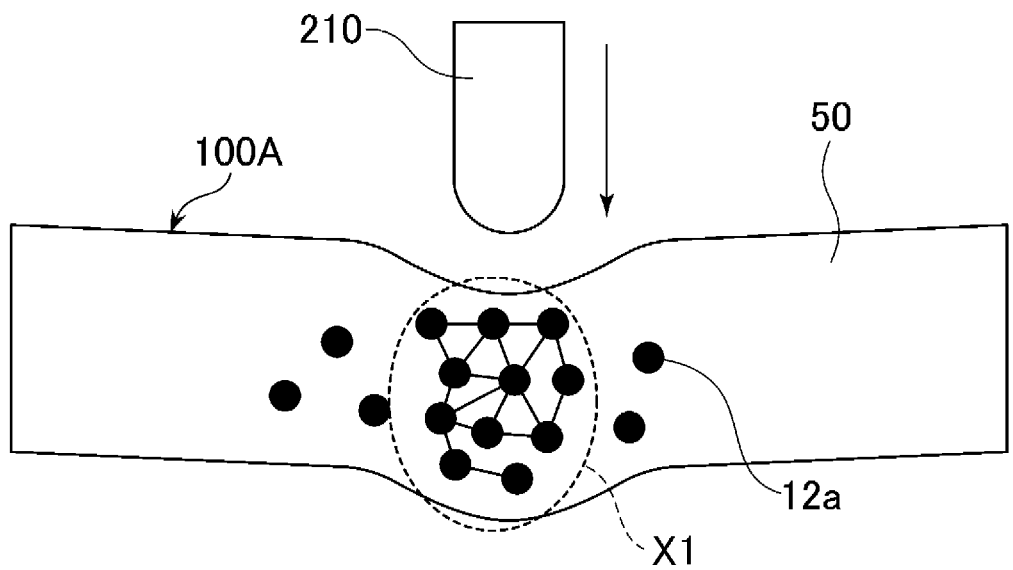
FIG. 8 is a schematic diagram that explains a state where a test piece has been subjected to an impact in a narrow region.
Figure 9:
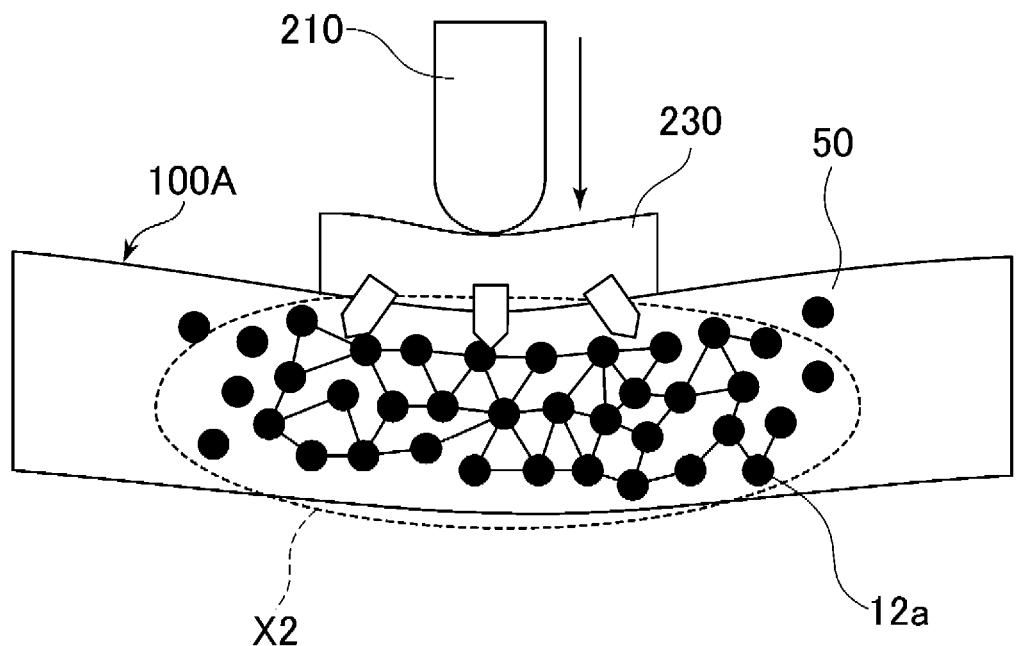
FIG. 9 is a schematic diagram that explains a state where a test piece has been subjected to an impact in a wide region.

In the carbon fiber-reinforced molded article 100 in accordance with this embodiment, the modulus of elasticity obtained by conducting a three-point bending test with a cushioning material is smaller than the modulus of elasticity obtained by conducting the three-point bending test without a cushioning material. In a case where the three-point bending test is conducted at a loading speed which is a high speed of 1 m/s, a large impact is locally applied to a narrow region X1 as indicated in FIG. 8 of the test piece 100A of the carbon fiber-reinforced molded article 100. In the three-point bending test with the cushioning material 230, as illustrated in FIG. 9 since the region where the impact is applied is enlarged to the region X2, the impact applied locally to the test piece 100A is reduced.

The carbon fiber-reinforced molded article 100 includes a composite material 10 that contains carbon fibers 12a having a high modulus of elasticity and a cured resin product 50 having a low modulus of elasticity. The CNTs 14a adhering to the surfaces of the carbon fibers 12a affect the modulus of elasticity of the cured resin product 50. The relationship between the impact applied to the carbon fiber-reinforced molded article 100 and the modulus of elasticity was examined in the following manner.

The carbon fibers 12a contained in the composite material 10 in the carbon fiber-reinforced molded article 100 are displaced when an impact is applied thereto. The displacement of the carbon fibers 12a becomes larger when the impact becomes larger. In a case where the displacement of the carbon fibers 12a is large, the CNTs 14a adhering to the surfaces are sufficiently and fully extended, so that a large restraint effect can be obtained by the network structure of the CNTs 14a. In other words, such CNTs 14a exhibit the properties of CNTs and the modulus of elasticity of the cured resin product 50 can be increased.

The modulus of elasticity EM0 according to the three-point bending test without a cushioning material is the one that takes into account the increased modulus of elasticity of the cured resin product 50. In a case where no cushioning material is present, an impact is locally applied to the carbon fiber-reinforced molded article 100 and the displacement width in a minute region becomes large. The restraint effect works significantly by the network of the CNTs 14a adhering to the surfaces of the carbon fibers 12a, and a high elasticity is obtained.

In a case where displacement of carbon fibers 12a is small, in other words, in a case where the impact locally applied to the carbon fiber-reinforced molded article 100 is small, since the CNTs 14a on the surfaces of the carbon fibers 12a cannot be fully extended and are bent, the obtained restraint effect is small. The CNT 14a, in a state where they are not fully extended, cannot exert the effect of enhancing the modulus of elasticity of the cured resin product 50. As a result, the cured resin product 50 maintains the original modulus of elasticity.

As the CNTs 14a adhere to the carbon fibers 12a, the carbon fiber-reinforced molded article 100 has a high vibration damping effect. In other words, the carbon fiber-reinforced molded article 100 efficiently absorbs the impact applied from the outside. In the carbon fiber-reinforced molded article 100, a composite layer of the CNTs 14a and a resin (not shown) exists between the carbon fibers 12a. When vibrations propagate between the carbon fibers 12a, energy absorption by friction at the composite layer occurs, so that the impact energy can be absorbed efficiently.

Accordingly, in a case where the displacement of the carbon fibers 12a is small, the carbon fiber-reinforced molded article 100 will have a smaller modulus of elasticity than that of a molded article that does not contain the CNTs 14a. Since the carbon fibers 12a cause less entanglement and are excellent in linearity, the influence of the displacement of the carbon fibers 12a is noticeable.

For this reason, the modulus of elasticity EM1 according to the three-point bending test with a cushioning material will be a smaller value than the modulus of elasticity EM0 according to the three-point bending test without a cushioning material. The carbon fiber-reinforced molded article 100 is excellent in the damping properties because the modulus of elasticity EM1 according to the three-point bending test with a cushioning material is smaller than the modulus of elasticity EM0 according to the three-point bending test without a cushioning material.

Further, the carbon fiber-reinforced molded article 100 has high strength because the CNTs 14a adhere to the respective surfaces of the carbon fibers 12a contained in the composite material 10.

4. MODIFIED EXAMPLE

The present invention is not limited to the above-described embodiment and can be modified as appropriate within the range of the purport of the present invention.

The cured resin product 50 contained in the carbon fiber-reinforced molded article 100 can be provided as a cured product of thermosetting resins such as unsaturated polyester resin and thermoplastic resins such as phenoxy resin and polyamide resin, polypropylene resin, polyphenylene sulfide resin, and polycarbonate resin.

The test piece 100A used in the three-point bending test is not limited to the one having the length L of 100 mm. It is possible to use any test piece 100A having any appropriate length L as long as it can be supported by two supporting point 200 arranged with a distance of 80 mm so that the three-point bending test can be conducted and it has a width of 15 mm and a thickness of 1.8 mm.

When the moduli of elasticity EM0 and EM1 of the test piece 100A are determined, the three-point bending test without a cushioning material may be conducted to determine the modulus of elasticity EM0 after the modulus of elasticity EM1 is determined by conducting the three-point bending test with a cushioning material.

In the case of the above-described embodiment, the carbon fiber-reinforced molded article has been described based on the case where the prepreg is cut to a predetermined length and the prepregs are laminated with their longitudinal directions arranged, but the present invention is not limited to this. The carbon fiber-reinforced molded article may be laminated such that the longitudinal directions of the carbon fibers intersect with the carbon fibers of other overlapping layers.

5. EXAMPLES

Hereinafter, the present invention will be described in detail with examples illustrated, to which the present invention is not limited.

<Creation of Prepreg>

First, a prepreg to be used in the carbon fiber-reinforced molded article was created according to the procedure illustrated in the above-described manufacturing method. As the CNTs 14a, MW-CNTs (Multi-Walled Carbon Nanotubes) grown to a diameter of 10 to 15 nm and a length of 100 μm or more on a silicon substrate by thermal CVD were used.

The CNTs 14a were washed with a 3:1 mixed acid of sulfuric acid and nitric acid to remove catalyst residues and then filtered and dried. The CNT 14a were added to MEK as a dispersion medium and the dispersion was prepared. The CNTs 14a were crushed using an ultrasonic homogenizer and cut to a length of 0.5 to 10 μm. The concentration of CNTs 14a in the dispersion was set to 0.01 wt %. This dispersion does not contain the dispersing agent or the adhesive.

Figure 7:
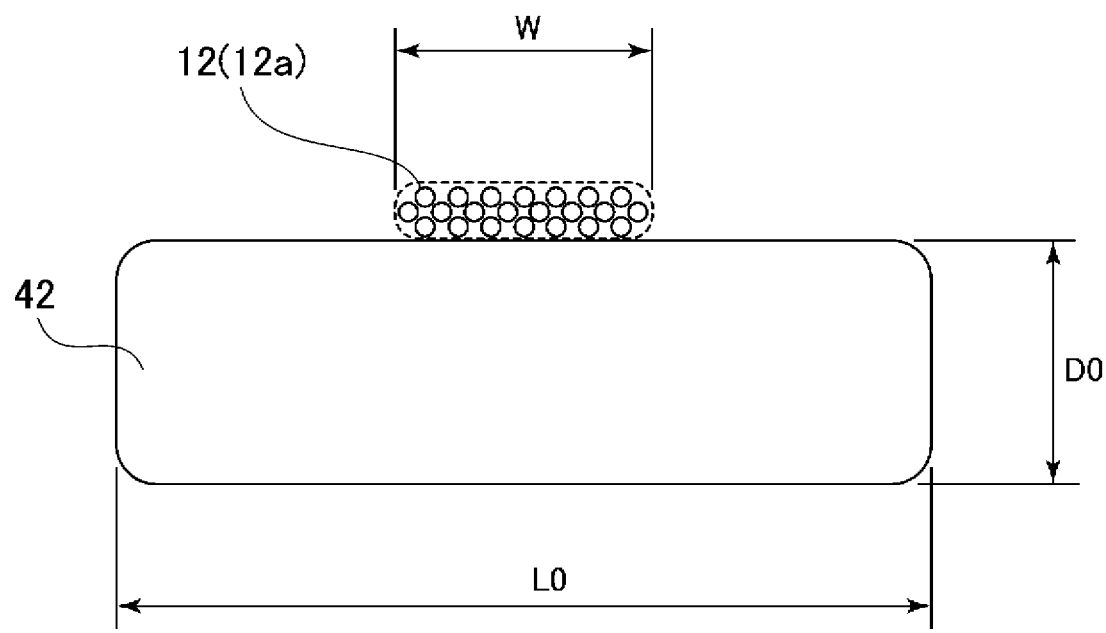
FIG. 7 is a side view that explains a guide roller.

The CNT adhesion tank 40 as illustrated in FIG. 6 was prepared and the dispersion 46 prepared in this manner was stored therein. In the CNT adhesion tank 40, the guide rollers 42 (with a diameter of 50 mm and a length of 100 mm) as illustrated with reference to FIG. 7 are provided. Vibration, ultrasound, and rocking as mechanical energy were applied to the dispersion 46.

As the carbon fiber bundle 12, T700SC-12000 (manufactured by Toray Industries, Inc.) was used. In the carbon fiber bundle 12, 12,000 carbon fibers 12a are contained. The diameter of the carbon fibers 12a is approximately 7 μm and the length is approximately 100 μm. The carbon fiber bundle 12 was immersed in the dispersion 46 and was made to travel by the guide roller 42 at a speed of 3.5 m/min.

After that, epoxy resin was used as the sizing agent and the sizing treatment was carried out, and they were dried on a hot plate at approximately 80° C. In this manner, the composite material 10 was created. The composite material 10 was a shape of a strip where 12 carbon fibers are piled in the thickness direction.

It was confirmed by SEM observation that, in the composite material 10, a plurality of CNTs 14a were uniformly dispersed on and adhered to the surfaces of the carbon fibers 12a contained in the carbon fiber bundle 12.

With regard to the composite material 10 that was obtained, the entanglement of the carbon fibers contained in the carbon fiber bundle was evaluated. The evaluation was conducted by examining the linearity of the carbon fibers relative to each other by a method such as the one that has been explained with reference to FIG. 5.

The composite material 10 was cut to a length of 150 mm to prepare a measurement sample 10B. With regard to the measurement sample 10B, one end thereof is fixed to the transverse bar portion 34 of the support stand 30 and the weight 24 of 20 g was connected to the other end. The inspection needle 20 (diameter of 0.55 mm) provided so as to extend from the standing portion 32 of the support stand 30 was pierced in the measurement sample 10B such that it traverses the longitudinal direction thereof. While the load acting between the measurement sample 10B and the inspection needle 20 was measured by a not-shown load cell, the transverse bar portion 34 from which the measurement sample 10B was suspended was raised by 40 mm at a speed of 300 mm/min.

The maximum value, the minimum value, and the average value of the measured load were 0.172 N, 0.00286 N, and 0.0764 N, respectively. It was confirmed that, in the composite material 10, there was substantially no entanglement of carbon fibers with each other in the carbon fiber bundle and the carbon fibers are arranged with the linearity maintained.

Subsequently, the composite material 10 was immersed in the epoxy resin as the matrix resin and the prepreg was created. The volume content of the resin in the prepreg was 30%. The weight per unit area of the composite material was 180 g/m$^2$.

<Preliminary Test>

Figure 10:
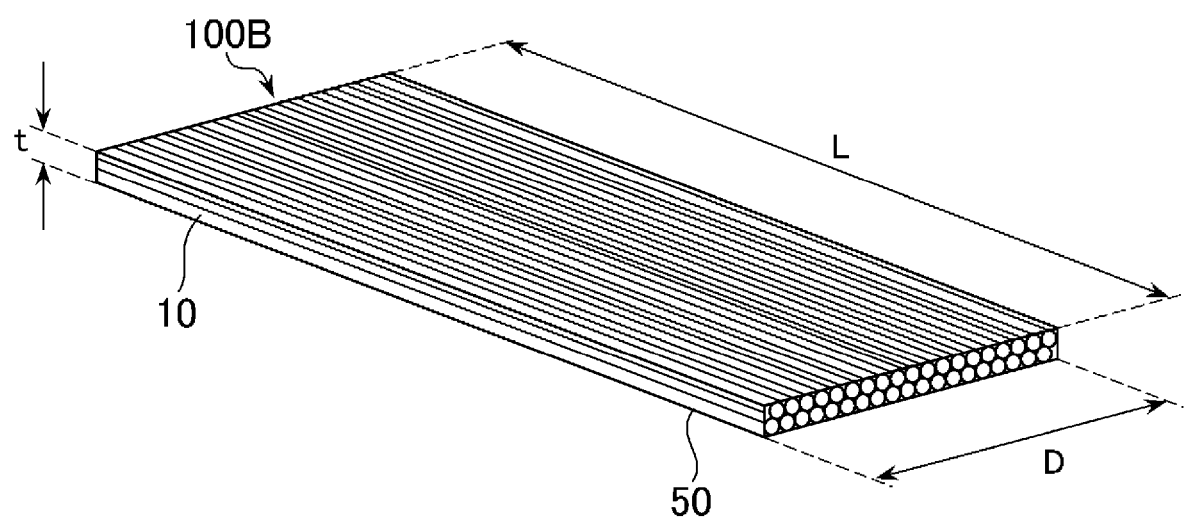
FIG. 10 is a perspective view that illustrates a test piece used in evaluation of vibration damping properties.

The test piece 100B in a plate-like shape as illustrated in FIG. 10 was created using the prepreg. The test piece 100B is a carbon fiber-reinforced molded article having a width D of 15 mm, a length L of 200 mm, and a thickness t of 1.72 to 1.78 mm. The test piece 100B was obtained by laminating prepregs cut to a length of 200 mm (16 layers) with the longitudinal directions of the prepregs aligned, heating them at 145° C. for one hour, and then curing the matrix resin. The test piece 100B includes the composite material 10 arranged with the length L corresponding to the longitudinal direction and the cured resin product 50.

Figure 11:
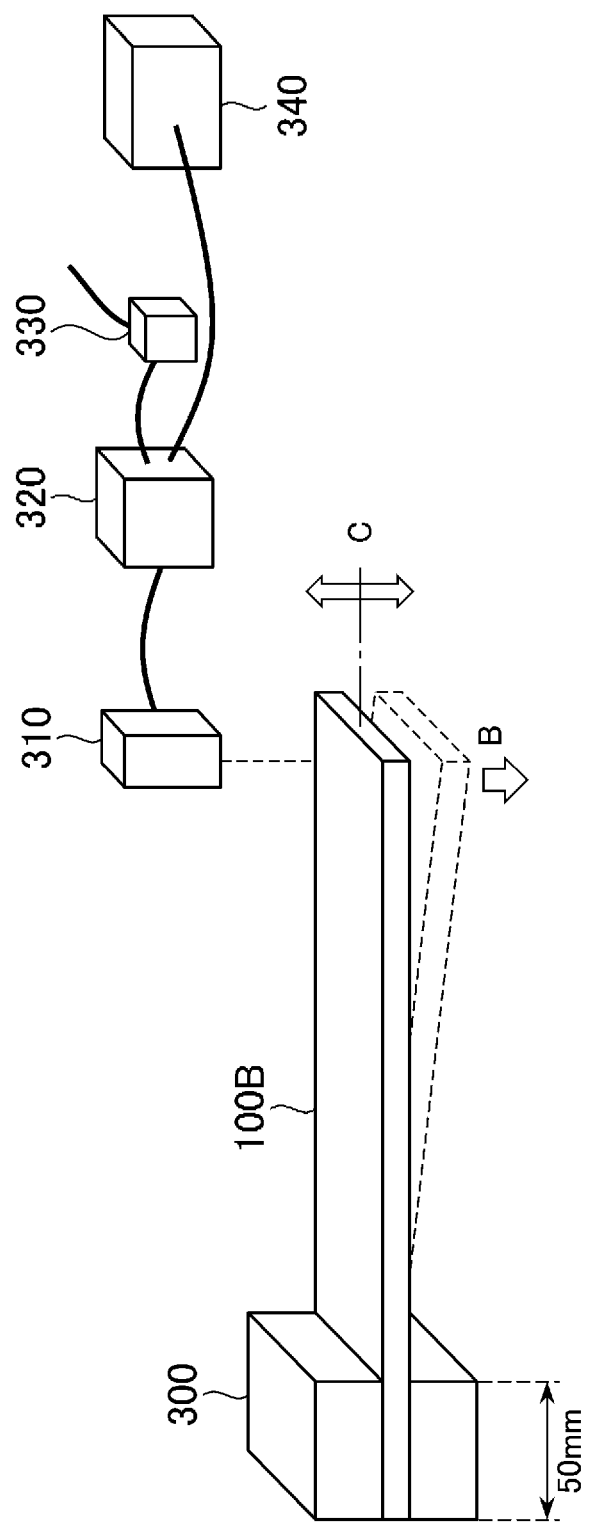
FIG. 11 is a schematic diagram that explains a method of evaluating vibration damping properties.

With regard to the test piece 100B, the vibration damping properties were evaluated. The method for evaluation of the vibration damping properties will be explained with reference to FIG. 11. An end of the long side of the test piece 100B (50 mm) is secured to the support stand 300. The other end of the test piece 100B is pressed downward by approximately 5 mm in the direction of the arrow B and then released, and thereby the test piece 100B is made to oscillate upward and downward (in the direction of the arrow C).

The amount of displacement of the test piece 100B is measured by a laser displacement meter (manufactured by Keyence Corporation, LK-G5000V/LK-H0850) 310 connected via a controller 320 to the power source 330. The measured displacement data is collected by a PC 340. Three test pieces 100B were prepared and the amount of displacement was measured three times for each of them.

Figure 12:
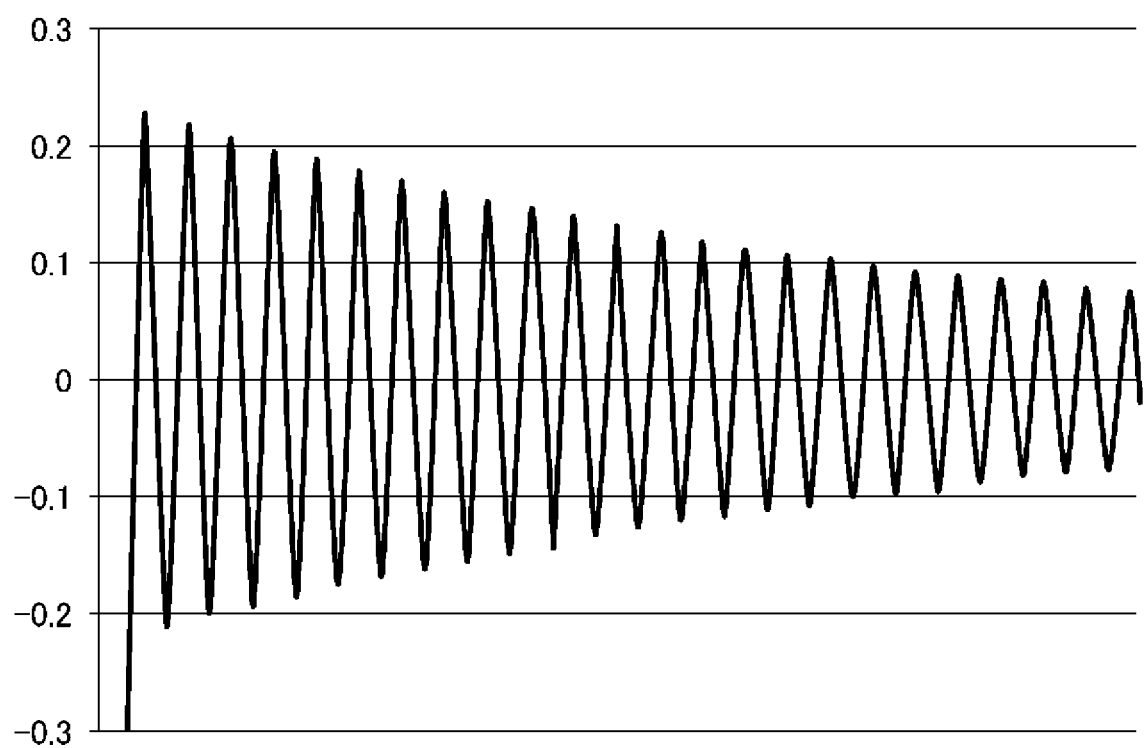
FIG. 12 is a graph that illustrates an example of temporal change in an amount of displacement that has been measured.

An example of the temporal change in the amount of displacement measured is shown by the graph in FIG. 12. In FIG. 12, the vertical axis indicates the amplitude, and the horizontal axis indicates the time. It is shown that the amplitude of the displacement decreases over passage of time. A logarithmic decrement δ was determined by averaging the decrements at 10 points from the maximum amplitude (positive peak). The logarithmic decrement δ was 0.0552.

The conventional carbon fiber reinforced plastic CFRP created in a plate-like shape similar to that of the test piece 100B had a logarithmic decrement δ of 0.0499 which was determined in the same manner as described above. In the creation of the conventional CFRP, the same prepreg similar to the one that has been described above was used except that the composite material was changed to the carbon fiber bundle in which the CNTs do not adhere to the surfaces of the carbon fibers. As the conventional CFRP has a smaller logarithmic decrement δ than that of the above-described test piece 100B, vibrations last long and take time to be damped.

It was confirmed that the carbon fiber-reinforced molded article 100 that contains the composite material 10 had a higher vibration damping effect than that of the conventional CFRP. The carbon fiber-reinforced molded article 100 can absorb the impact applied thereto more quickly. It is inferred that the improvement in the damping properties was caused by the CNTs 14a adhering to the surfaces of the carbon fibers 12a contained in the composite material 10.

Example 1

A plate-like test piece 100A as illustrated in FIG. 2 was created using the above-described prepreg. The test piece 100A is a carbon fiber-reinforced molded article having a width D of 15 mm, a length L of 100 mm, and a thickness of 1.8 mm. The test piece 100A was obtained by laminating prepregs cut to a length of 15 mm with the longitudinal directions of the prepregs aligned, and then curing the matrix resin by heating at 145° C. for one hour. The test piece 100A includes the composite material 10 arranged with the width D corresponding to the longitudinal direction and the cured resin product 50.

A three-point bending test was conducted on the test piece 100A. A high-speed impact tester (EHF-22H-20L, manufactured by Shimadzu Corporation) was used for the test. First, as has been explained with reference to FIG. 3A, the test piece 100A was supported by the two supporting point 200 provided with the distance of 80 mm from each other. While the load was measured by the load cell 220, the indenter 210 was made to collide directly with the test piece 100A at a loading speed of 1 m/s. By using the load when the test piece 100A was broken, the modulus of elasticity EM0 in the case where no cushioning material is present was determined.

Next, as has been illustrated in FIG. 3B, an NR sponge rubber with a length of 30 mm, a width of 20 mm, and a thickness of 5 mm (Wakisangyo Co., Ltd, NRS-07) as a cushioning material 230 was placed on the test piece 100A and, in the same manner as described above, the indenter 210 was made to collide with the test piece 100A at a loading speed of 1 m/s. The NR sponge rubber has a specific gravity of 0.08 g/cm$^3$, an expansion ratio of 11 times, and an Asker C hardness of 23 determined in accordance with the Society of Rubber Industry, Japan, Standard (SRIS). By using the load when the test piece 100A was broken, the modulus of elasticity EM1 of the case where a cushioning material is present was determined.

Figure 13:
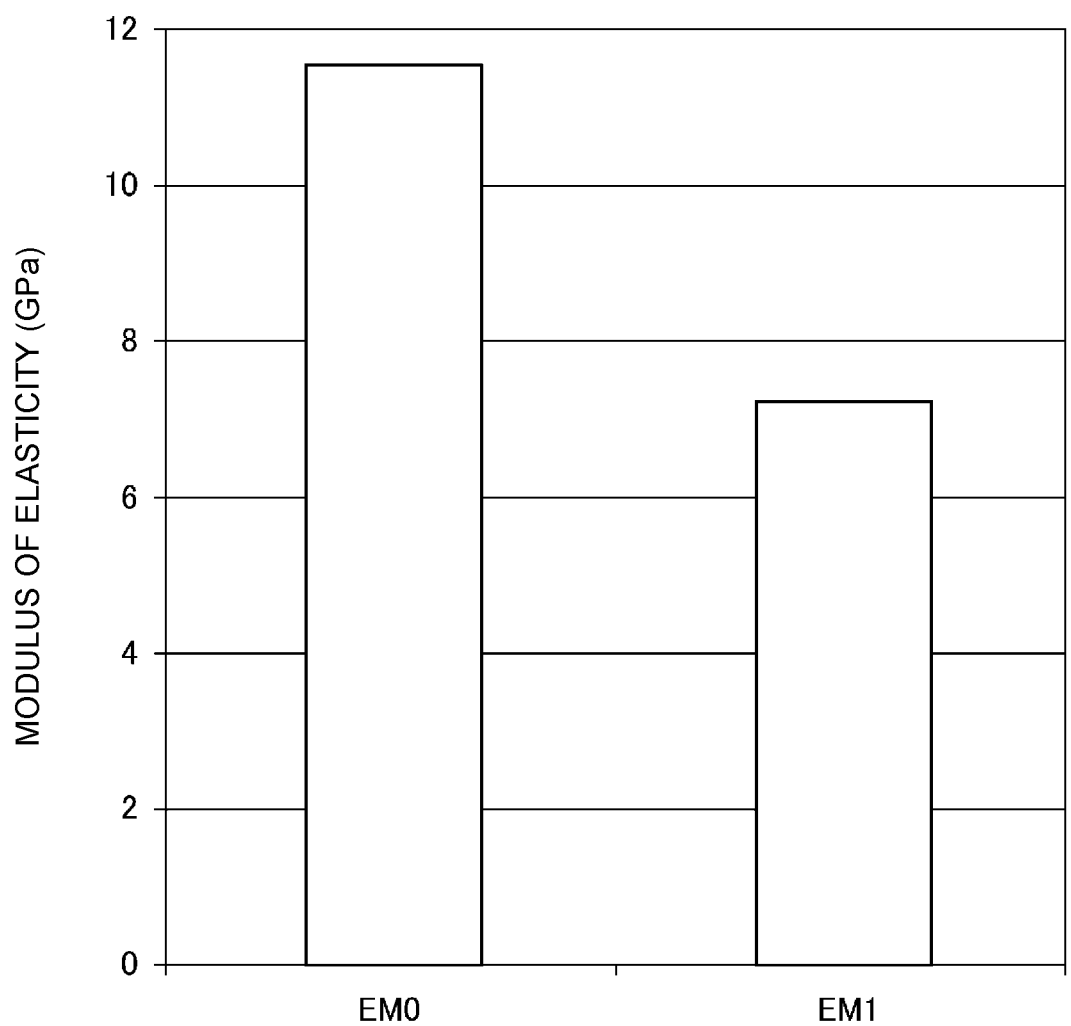
FIG. 13 is a graph that illustrates a modulus of elasticity of the carbon fiber-reinforced molded article of the example 1.

The determined moduli of elasticity EM0 and EM1 are shown in the graph of FIG. 13. In the carbon fiber-reinforced molded article of the example 1, whereas the modulus of elasticity EM0 when the test is conducted without a cushioning material is 11.7 GPa, the modulus of elasticity EM1 when the test is conducted with a cushioning material is 7.2 GPa. When the indenter is made to collide with the test piece via the cushioning material, the modulus of elasticity EM1 is reduced to 0.615 times the modulus of elasticity EM0 in the case where no cushioning material is present.

Comparative Example 1

Figure 14:
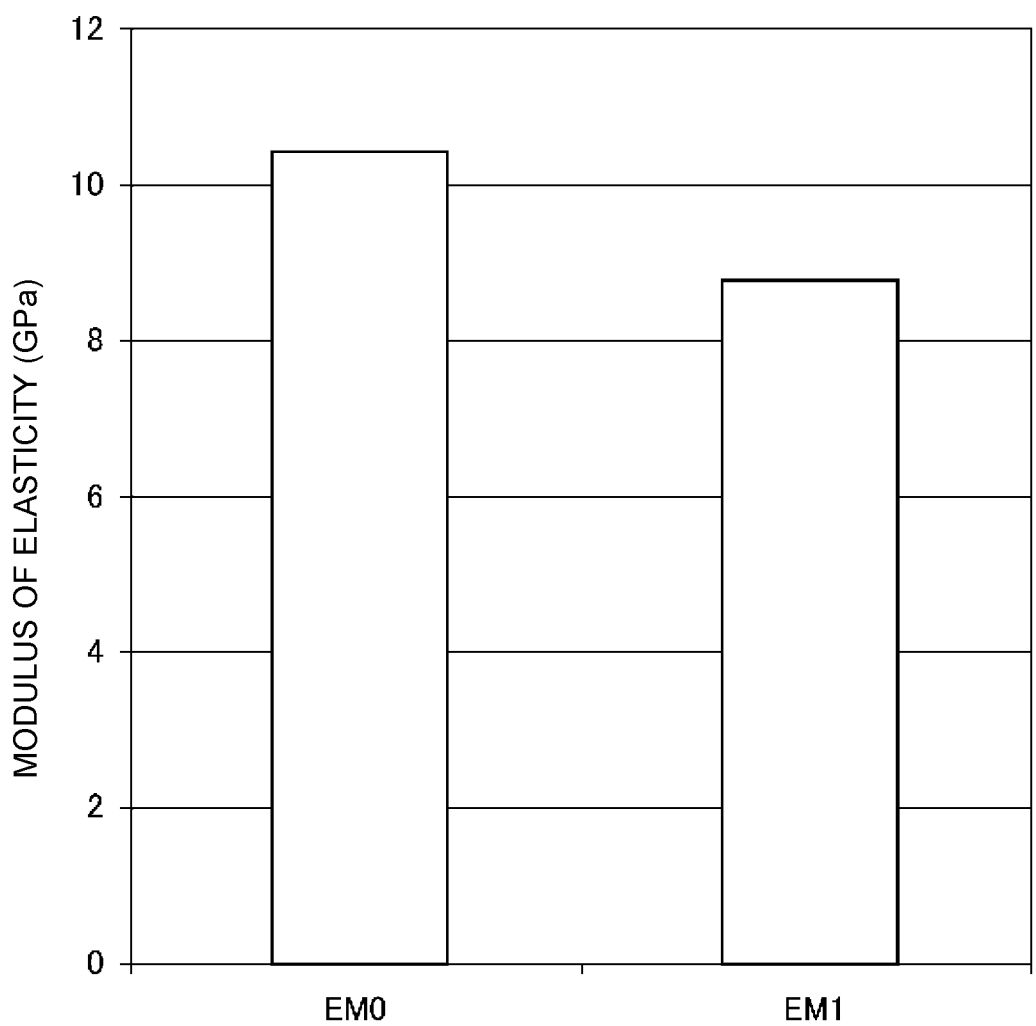
FIG. 14 is a graph that illustrates a modulus of elasticity of the comparative example 1 (conventional CFRP).

With regard to the conventional carbon fiber reinforced plastic CFRP created in a plate-like shape similar to that of the test piece 100A, the moduli of elasticity (EM0 and EM1) determined in the similar manner as described above are shown in FIG. 14. In the creation of the conventional CFRP, the same prepreg similar to that of the example 1 was used except that the composite material was changed to the carbon fiber bundle in which the CNTs do not adhere to the surfaces of the carbon fibers.

In the comparative example 1 (conventional CFRP), whereas the modulus of elasticity EM0 when the test is conducted without a cushioning material is 10.5 GPa, the modulus of elasticity EM1 when the test is conducted with a cushioning material is 8.6 GPa. In the comparative example 1 as well, in the same manner as in the example 1, when the indenter is made to collide via the cushioning material, the modulus of elasticity is reduced. However, the modulus of elasticity EM1 of the case where a cushioning material is present is 0.819 times the modulus of elasticity EM0 in the case where no cushioning material is present, and the degree of reduction is smaller than in the example 1.

<Comparison of Moduli of Elasticity EM0 with Each Other and Moduli of Elasticity EM1 with Each Other>

Figure 15:
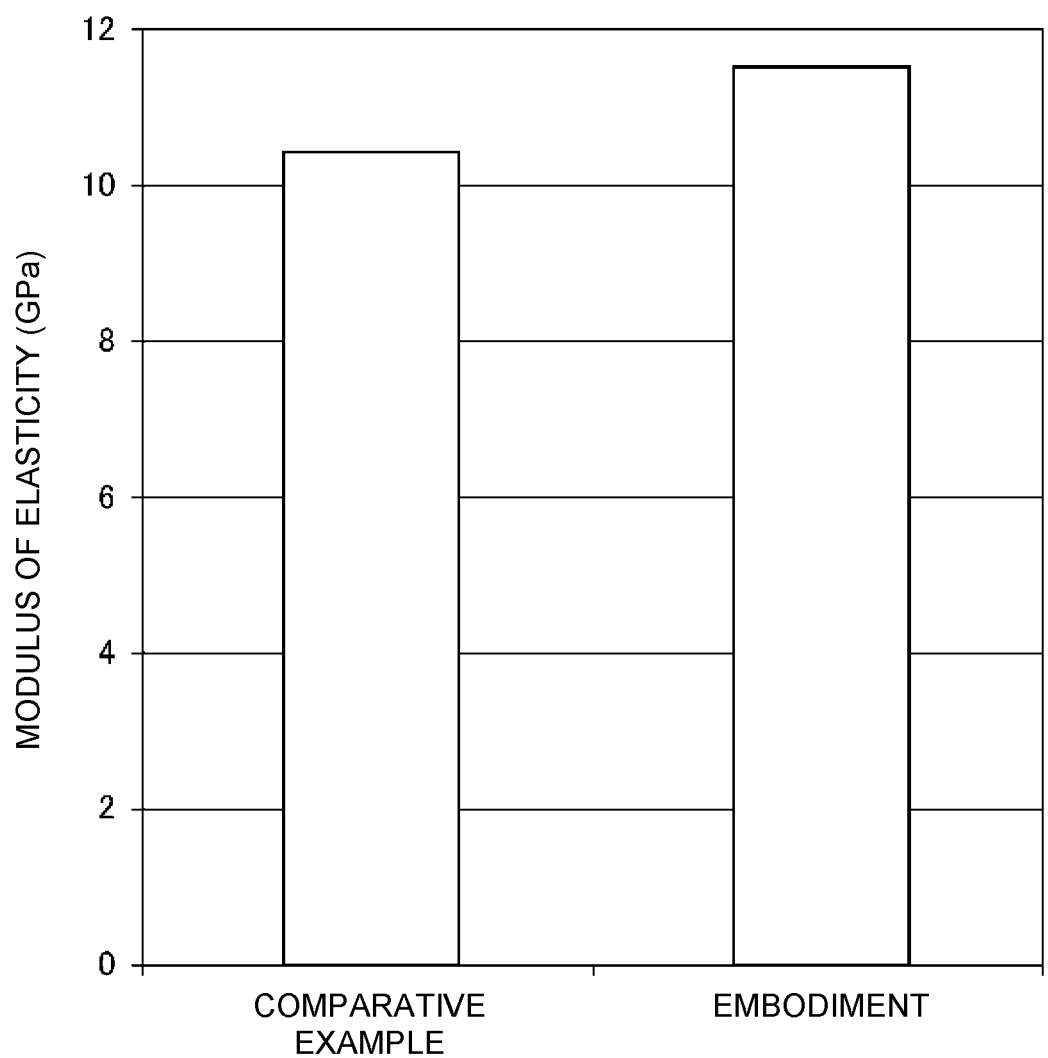
FIG. 15 is a graph that illustrates for comparison a modulus of elasticity according to a three-point bending test without a cushioning material.
Figure 16:
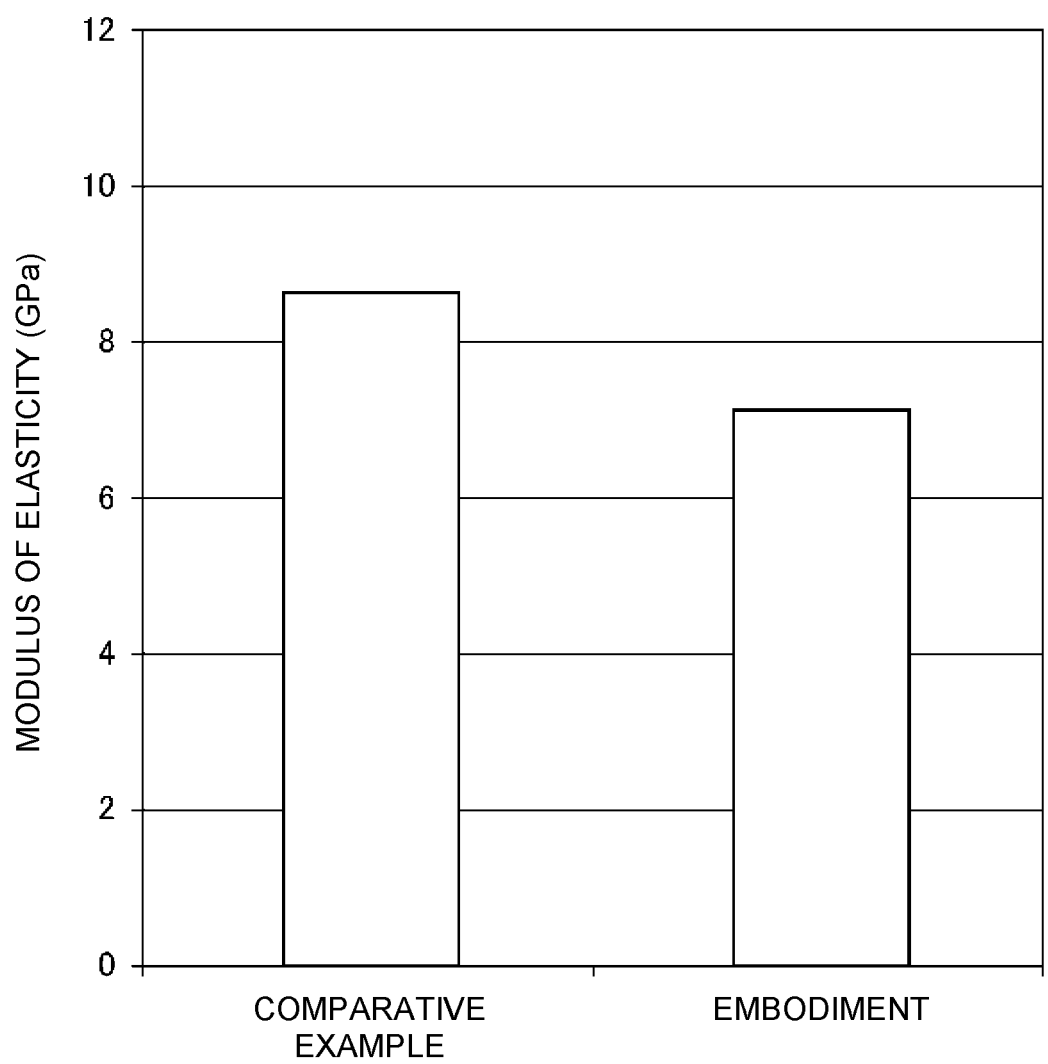
FIG. 16 is a graph that illustrates for comparison a modulus of elasticity according to a three-point bending test with a cushioning material.

The moduli of elasticity of the example 1 and the comparative example 1 are shown together in FIGS. 15 and 16. FIG. 15 shows the modulus of elasticity EM0 obtained by conducting the three-point bending test without a cushioning material and FIG. 16 shows the modulus of elasticity EM1 obtained by conducting three-point bending test with a cushioning material.

As illustrated in FIG. 15, the modulus of elasticity EM0 obtained by conducting the three-point bending test without a cushioning material of the example 1 is larger by approximately 10.5% than that of the comparative example 1. In the example 1, it is inferred that this was caused by the fact that the modulus of elasticity of the cured resin product was increased by the CNTs adhering to the surfaces of the carbon fibers.

The modulus of elasticity EM1 obtained by conducting the three-point bending test with a cushioning material has an inverted magnitude relationship and the example 1 is smaller by approximately 18.2% than the comparative example 1. In the example 1, it is inferred that the vibration damping effect of the CNTs adhering to the surfaces of the carbon fibers was exerted.

Example 2

Figure 17:
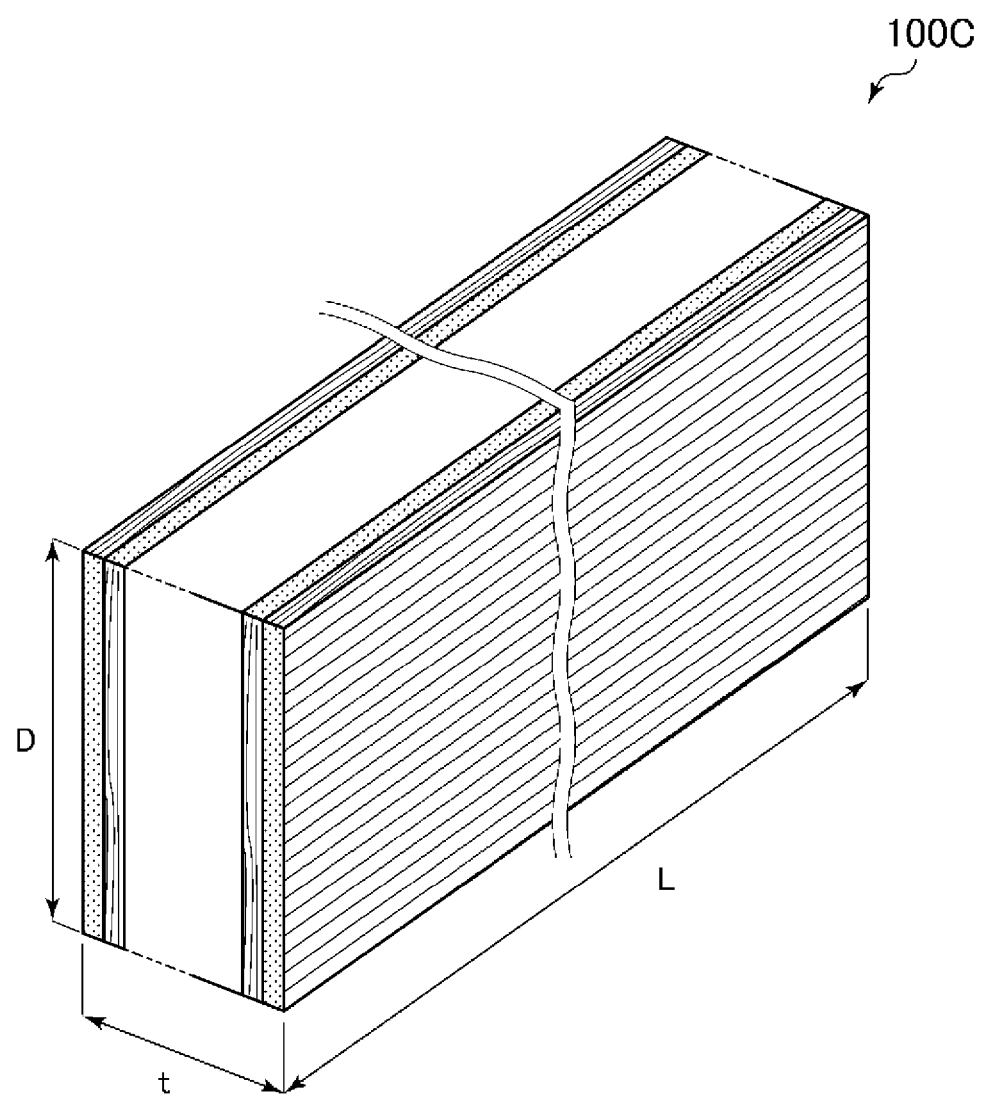
FIG. 17 is a perspective view that illustrates a test piece used in a Charpy impact test.

A test piece 100C in a plate-like shape as illustrated in FIG. 17 was created using the above-described prepreg. The test piece 100C is a carbon fiber-reinforced molded article having a width D of 15 mm, a length L of 100 mm, and a thickness t of 1.8 mm. The test piece 100C was obtained by laminating prepregs such that the longitudinal directions of the carbon fiber bundles are orthogonal (17 layers), and curing the matrix resin by heating at 145° C. for 1.5 hours. The layers of both surfaces of the test piece 100C were arranged such that the longitudinal directions of the carbon fiber bundles are parallel, in other words, zero degree, to the longitudinal direction of the test piece 100C.

Comparative Example 2

As comparison, a test piece was created which is similar to the test piece 100C except that the composite material was changed to the carbon fiber bundle in which the CNTs do not adhere to the surfaces of the carbon fibers.

(Charpy Impact Test)

Figure 18A:
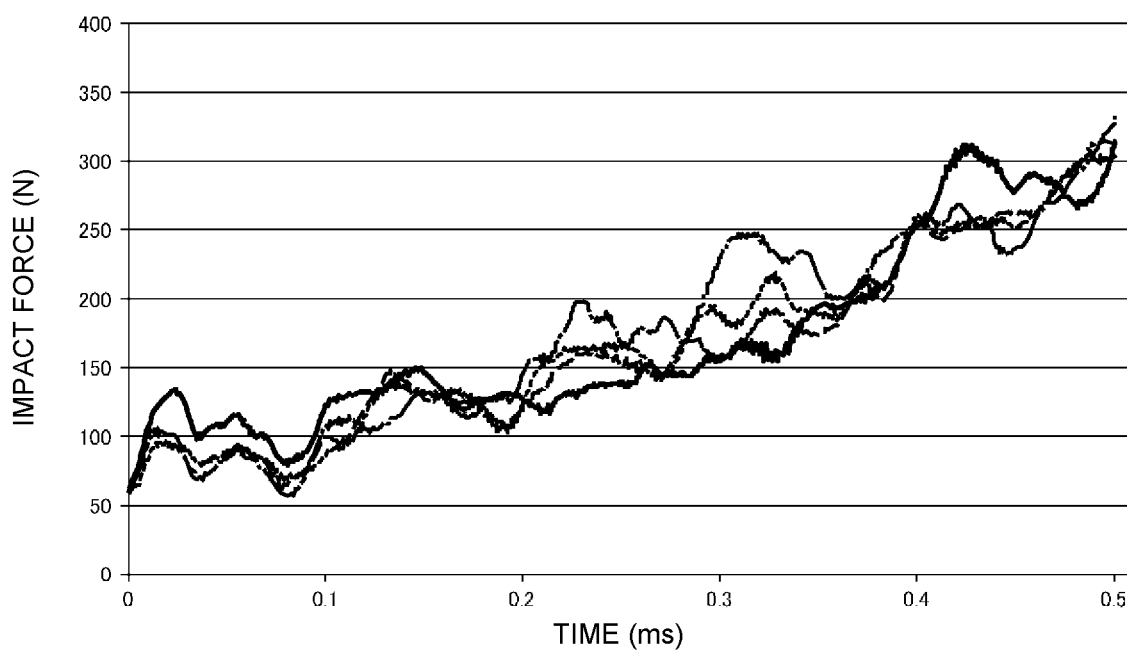
FIG. 18A is that of the example 2 and FIG. 18B is that of the comparative example 2.
Figure 18B:
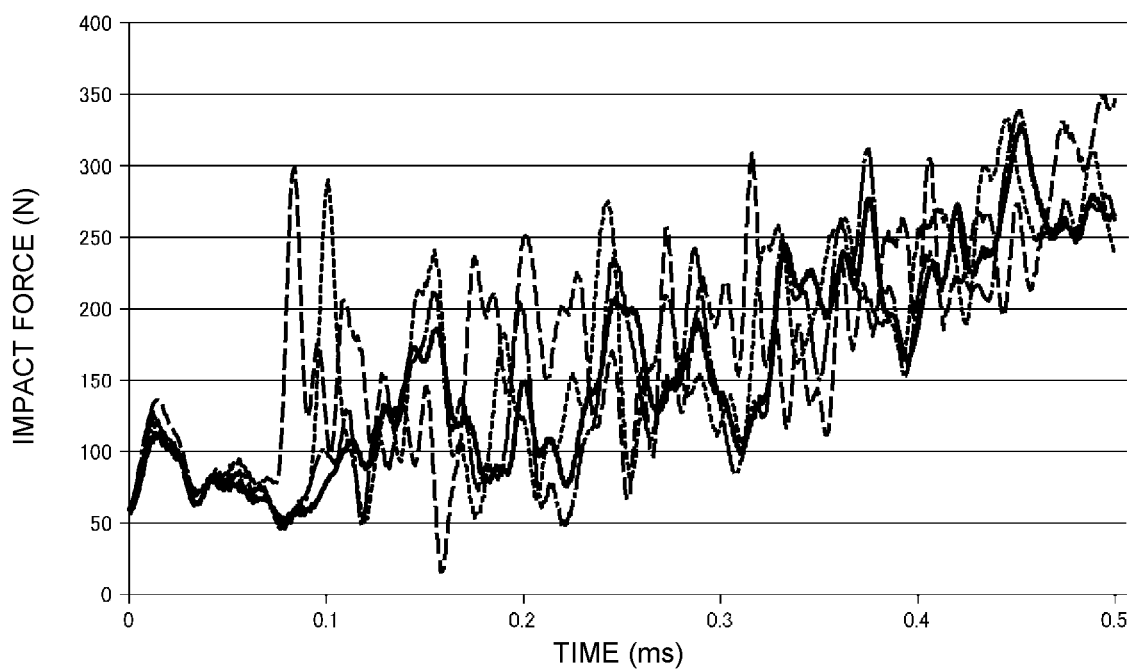

Four each of the test pieces were prepared, a pendulum tester (manufactured by Instron, CEAST 9050, hammer capacity: 25 J) was used, a Charpy impact test (in accordance with JIS K 7077) was conducted, and the impact force was measured by a load cell provided in the hammer. The results are shown in FIGS. 18A and 18B. The horizontal axis of this figure indicates the time (ms), the vertical axis indicates the impact force (N), and the curve indicates an impact force-load curve measured of the four test pieces. A peak in each curve is caused by inertia of the test piece after the test piece contacts the hammer. From this figure, it is clear that the example 2 has more moderate rises and falls of the impact force and less vibrations than in the comparative example 2.

Based on this figure, the greatest value of the differences of the impact force (N) between the neighboring peaks and troughs (hereinafter referred to as a degree of vibration) are shown in Table 1. The maximum value of the degree of vibration in 0.5 ms after the hammer contacted the test piece was 72(N) in the example 2 and 235(N) in the comparative example 2. From this fact, it has been confirmed that the degree of vibration of example 2 is about one third of that of the comparative example 2 and the example 2 is excellent in the damping properties.

TABLE 1

| TEST PIECE NO. | CARBON FIBER-REINFORCED MOLDED ARTICLE | CONVENTIONAL CFRP |
| --- | --- | --- |
| 1 | 46.67735 | 220.2587 |
| 2 | 70.01602 | 141.4907 |
| 3 | 44.73246 | 234.8454 |
| 4 | 71.96091 | 190.1129 |
| AVERAGE | 58.34668 | 196.6769 |
| MAXIMUM VALUE | 71.96091 | 234.8454 |
| MINIMUM VALUE | 44.73246 | 141.4907 |

Example 3

A test piece in a plate-like shape was created using the above-described prepreg according to the same procedure as in the example 2. The test piece is a carbon fiber-reinforced molded article having a width D of 60 mm, a length L of 60 mm, and a thickness t of 1.8 mm.

Comparative Example 3

As comparison, a test piece was created which is similar to the test piece of the example 3 except that the composite material was changed to the carbon fiber bundle in which the CNTs do not adhere to the surfaces of the carbon fibers.

(Weight-Drop Test)

Figure 20A:
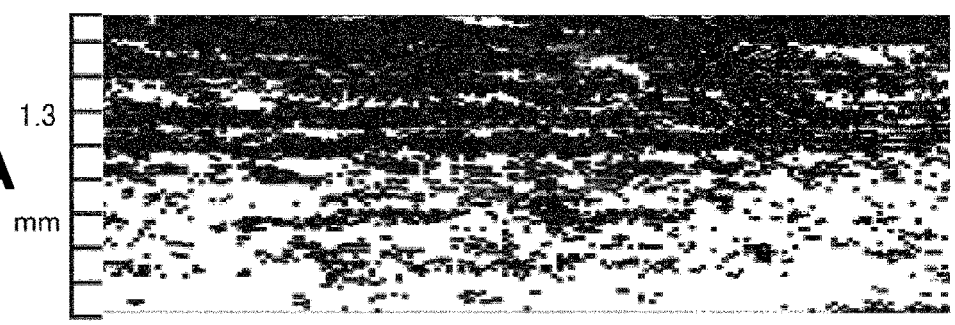
FIG. 20A is that of the example 3 and FIG. 20B is that of the comparative example 3.
Figure 20B:
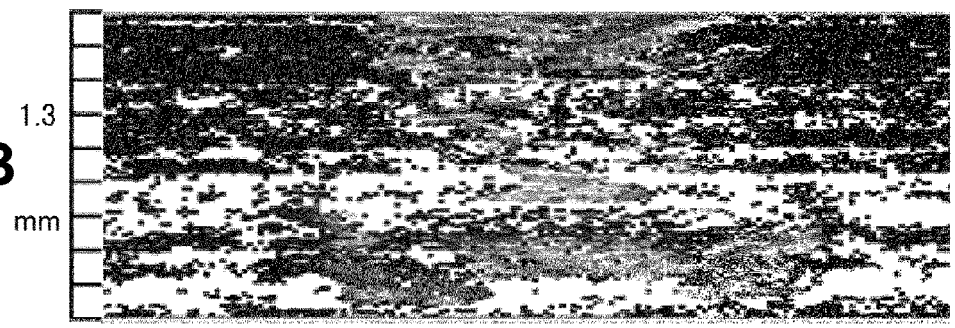

Each test piece is placed on the weight-drop tester and a stainless weight whose tip is hemispherical (with a diameter of 30 mm and a weight of 440 g) is dropped from the height of 350 mm, and an impact was applied to the test piece. The inside of the test piece after the test was analyzed by an ultrasonic flaw tester (manufactured by KJTD Co., Ltd., desktop type ultrasonic flaw imaging system). The test piece analysis of which was completed was further subjected to two impacts according to the above-described procedure and the inside was analyzed in the similar manner. The results are shown in FIGS. 19 and 20 as a screen of cross section measurement from the surface direction and a screen of cross section measurement from the lateral direction. It should be noted that the screen of cross section measurement from the lateral direction is of the range of 1.3 mm from the position of 0.45 mm in the depth direction from the surface. In the screen of cross section measurement from the surface direction of the same figure, in the case where peeling does not occur in the inside of the test piece, it is indicated in black. In the screen of cross section measurement from the lateral direction, the portion where peeling occurs in the inside of the test piece is indicated by an intermediate color between black and white.

In the example 3, most part of the screen of cross section measurement from the surface direction is indicated in black and an intermediate color is hardly ascertained in the screen of cross section measurement from the lateral direction, from which it has been confirmed that almost no peeling occurred in the inside. Meanwhile, in the comparative example 3, portions of an intermediate color can be ascertained at a location corresponding to the mark of the impact of the weight in the screen of cross section measurement from the surface direction, and it can be seen that the portions at issue are significantly damaged. Also, in the screen of cross section measurement from the lateral direction of the comparative example 3, a significant degree of peeling occurred at or around the portion 0.2 mm away from the back surface side and it has been confirmed that peeling occurred over the entire section in the thickness direction.

From this result, it has been revealed that the example 3 can achieve significantly excellent impact resistance as compared with the comparative example 3.

REFERENCE SIGNS LIST

100: carbon fiber-reinforced molded article
10: composite material
12: carbon fiber bundle
12a: carbon fibers
14a: carbon nanotubes (CNT)

The invention claimed is:

1. A carbon fiber-reinforced molded article comprising:
an arranged composite material and a cured resin product, wherein
the composite material includes a carbon fiber bundle in which a plurality of continuous carbon fibers are arranged and carbon nanotubes adhering to respective surfaces of the carbon fibers, wherein the carbon nanotubes are uniformly dispersed and entangled across respective entire surfaces of the carbon fibers, and the carbon nanotubes are in direct contact with or directly connected to one another to form a network structure,
the plurality of continuous carbon fibers are linearly arranged under tension by a plurality of flat guide rollers and travel at a constant depth inside a dispersion containing the carbon nanotubes when the carbon nanotubes are adhered to the respective surfaces of the carbon fibers, and a modulus of elasticity $EM1$ obtained by conducting a three-point bending test with a cushioning material and a modulus of elasticity $EM0$ obtained by conducting the three-point bending test without the cushioning material satisfy the following expression:

$$EM1 \text{ (GPa)} \leq 0.615 \times EM0 \text{ (GPa)}, \text{ where}$$

the three-point bending test is conducted on a test piece that has a shape of a plate with a width of 15 mm and a thickness of 1.8 mm,
the width corresponds to a longitudinal direction of the composite material,
the three-point bending test is conducted with supporting points away from each other by a distance of 80 mm and at a loading speed of 1 m/s, and
the cushioning material has dimensions of a length of 30 mm, a width of 20 mm, and a thickness of 5 mm.

2. The carbon fiber-reinforced molded article according to claim 1, wherein
the modulus of elasticity $EM0$ is larger than a modulus of elasticity in a case where the carbon nanotubes are not contained, and
the modulus of elasticity $EM1$ is smaller than a modulus of elasticity in a case where the carbon nanotubes are not contained.

3. The carbon fiber-reinforced molded article according to claim 1, wherein the modulus of elasticity $EM0$ falls within a range of 8 to 12 GPa.

4. The carbon fiber-reinforced molded article according to claim 1, comprising
a plurality of composite materials laminated such that longitudinal directions of the carbon fiber bundles are orthogonal to each other, wherein
when a Charpy impact test according to JIS K 7077 is conducted on a test piece having a width of 15 mm and a thickness of 1.8 mm, a degree of vibration of an impact force measured within 0.5 ms after contact of a hammer with the test piece is equal to or less than 72 N.

5. The carbon fiber-reinforced molded article according to claim 1, wherein the cured resin product is a cured product of epoxy resin.

* * * * *